June 2, 1953 V. K. ATKINS 2,640,499
FLEXIBLE DIAPHRAGM FOR FLUID CLUTCHES
Filed March 22, 1950 3 Sheets-Sheet 1
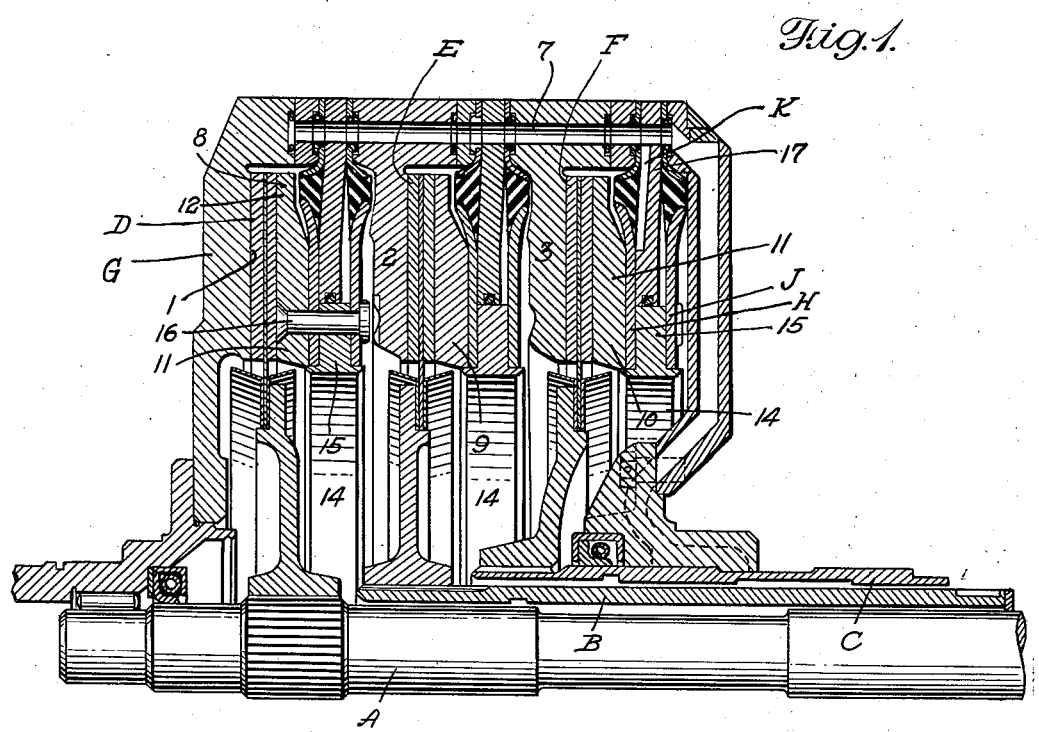
Fig. 1.
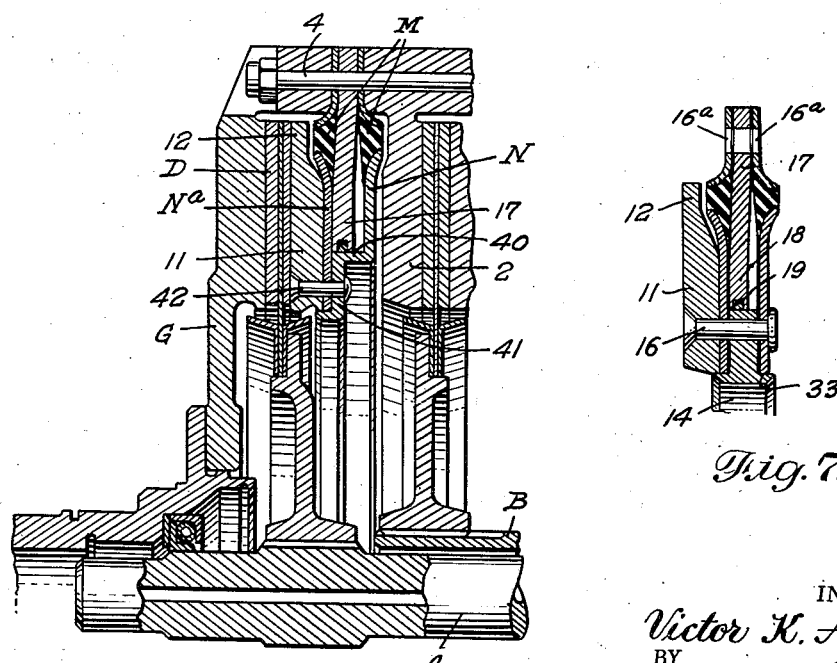
Fig. 6.
Fig. 7.
INVENTOR.
Victor K. Atkins,
BY
Ralph L. Barrett
ATTORNEY June 2, 1953     V. K. ATKINS     2,640,499
FLEXIBLE DIAPHRAGM FOR FLUID CLUTCHES
Filed March 22, 1950     3 Sheets-Sheet 2
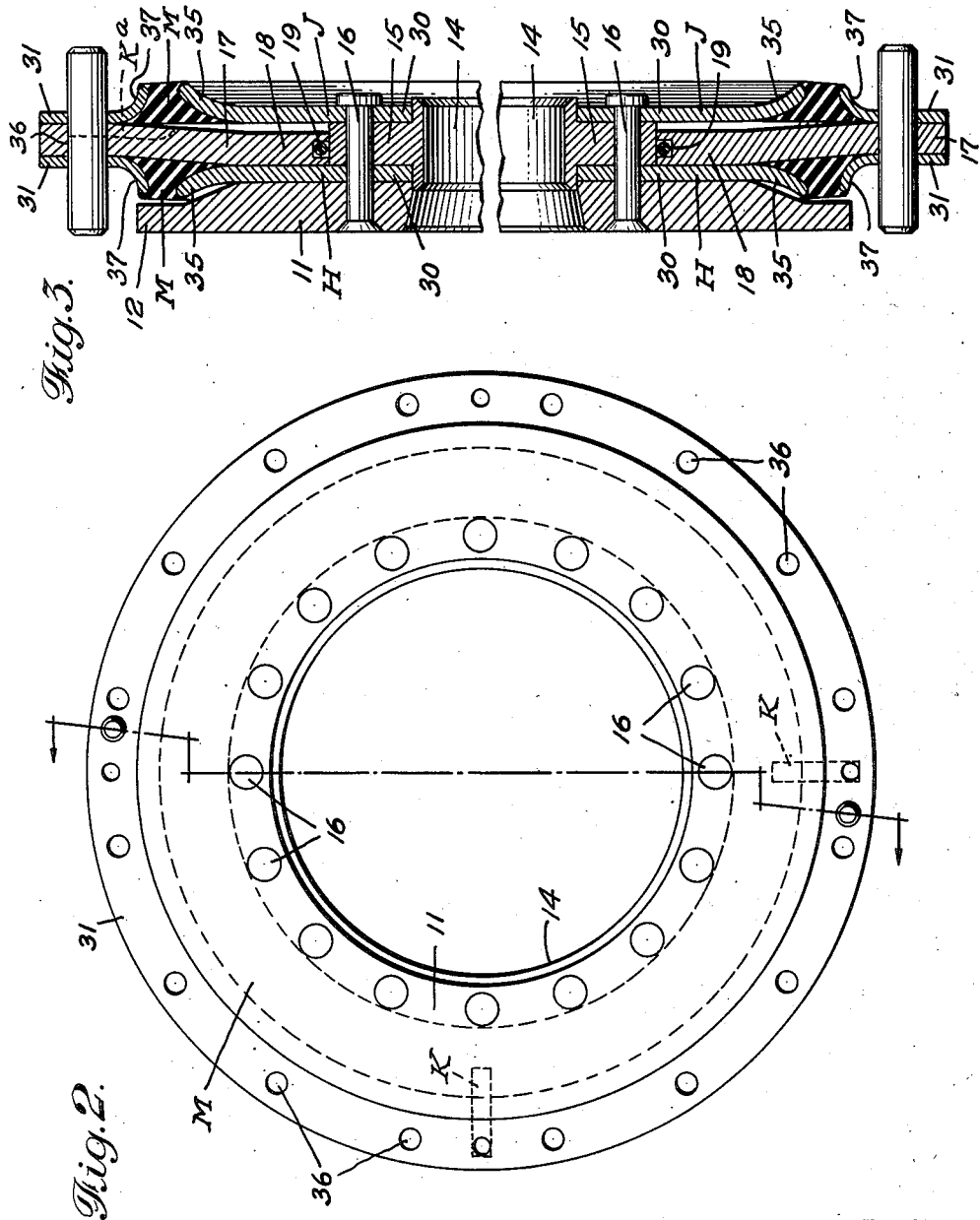
INVENTOR.
Victor K. Atkins,
BY Ralph L. Bassett
ATTORNEY June 2, 1953 V. K. ATKINS 2,640,499
FLEXIBLE DIAPHRAGM FOR FLUID CLUTCHES
Filed March 22, 1950 3 Sheets-Sheet 3
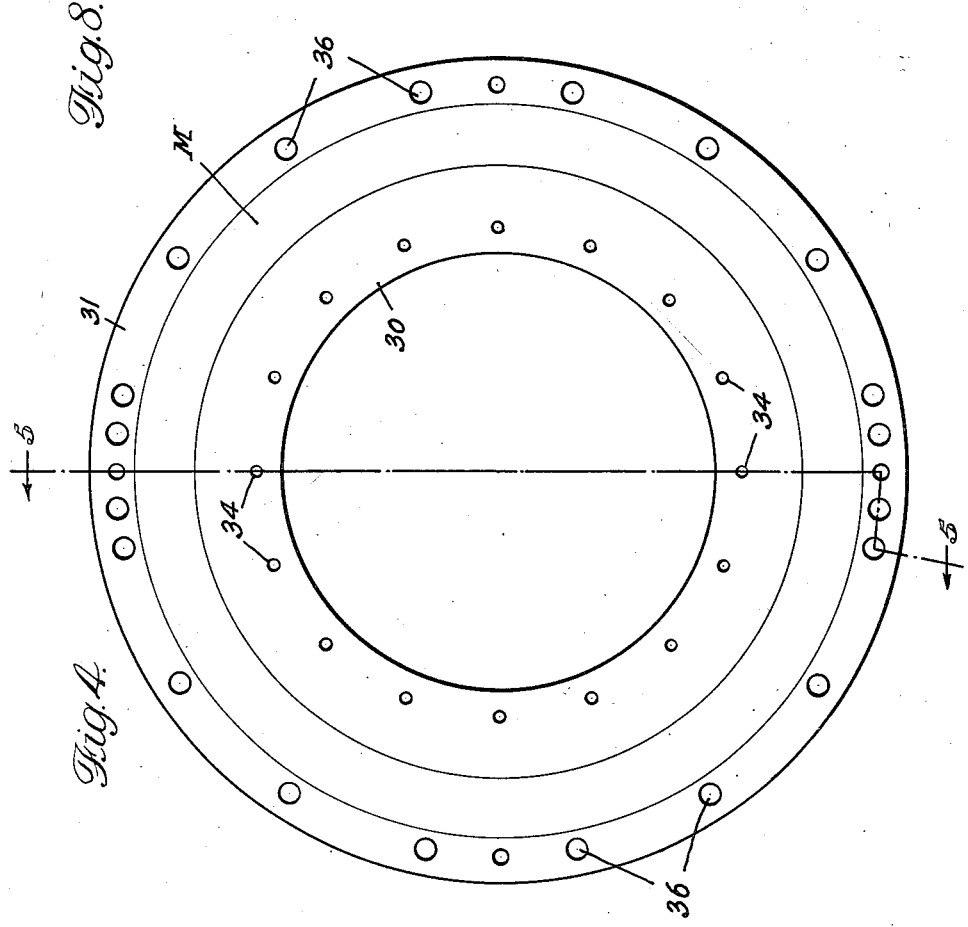
INVENTOR.
Victor K. Atkins,
BY
Ralph T. Bassett Patented June 2, 1953

2,640,499

UNITED STATES PATENT OFFICE 2,640,499

FLEXIBLE DIAPHRAGM FOR FLUID CLUTCHES

Victor K. Atkins, Seattle, Wash., assignor to Pacific Car and Foundry Company, Renton, Wash.

Application March 22, 1950, Serial No. 151,195

7 Claims. (Cl. 137—785)

This invention relates to improvements in clutches and comprehends an improvement in the clutch structure shown in application Serial No. 82,195, filed March 18, 1949, in the name of Carl E. Schou. In the prior application aforementioned, each clutch mechanism included a pair of resilient concave annular pressure plates or diaphragms which are connected and sealed at their marginal edges, the inner marginal edges being connected by a ring permitting unit shifting of the pair of annular plates, while the outer marginal edges are clamped between portions of the drum-like flywheel structure. Confined between the pressure plates at their outer marginal edges and between sections of the drum flywheel are medially arranged partitions or fixed backing plates, one backing plate extending between each pair of concave annular pressure plates and providing laterally spaced fluid chambers so that introduction of fluid into either chamber defined by an annular pressure plate and the adjacent face of the medial backing plate will result in a simultaneous shifting of the two diaphragms without deformation, the shifting being to a position sufficient to engage and operate an associated clutch pressure plate. In some instances it is desirable to use in lieu of metallic diaphragm structures, a diaphragm which includes in its structure the use of a resilient composition in order to provide for an extremely high fatigue resistance, although normally the life factor of metallic diaphragms of bronze, beryllium copper and other suitable alloys will be entirely satisfactory.

It is the object of the instant invention to provide a diaphragm for use in a fluid motor wherein the plate includes a resilient material which is so utilized that it absorbs all flexing and inherent vibration.

Another object of the invention is to provide a diaphragm made up of two rigid members bonded to a flexible intermediate member of a suitable resilient material whereby the resilient part eliminates the use of return springs and performs the function normally performed by such return springs when the pressure is released.

Another feature of the invention is the construction of a diaphragm for use in a clutch assembly wherein the diaphragm includes the use of a flexible material to absorb the lateral motion and torque.

Other features of the invention will more clearly hereinafter appear by reference to the accompanying drawings and specification in which like characters of reference designate corresponding parts, in which:

Fig. 1 is a one-half vertical sectional view through a clutch assembly disclosing one form of the invention;

Fig. 2 is a side elevation of one of the diaphragm structures;

Fig. 3 is a vertical sectional view through a fluid motor structure for use in clutches and embodying the structure of one form of the diaphragm plates;

Fig. 4 is a side elevation of the opposite side of a diaphragm structure of Fig. 2;

Fig. 5 is a vertical section through the preferred form of diaphragm;

Fig. 6 is a vertical fragmentary one-half section of a clutch assembly embodying a modified form of diaphragm;

Fig. 7 is a fragmentary vertical section through a fluid motor structure embodying a second modification of the diaphragm structure; and Fig. 8 is a vertical section through that type of diaphragm shown in Fig. 7.

In Fig. 1 of the drawings there is shown a partial vertical sectional view of a clutch assembly which embodies three clutch assemblies, each of which is constructed and arranged to drive separate shafts indicated as A, B, and C, the shaft A being a solid shaft and being driven from clutch assembly D, while the other shafts B and C are hollow and concentrically arranged about the central solid shaft A and are driven by clutch assemblies E and F, respectively. As is conventional in such clutch assemblies, rigid backing plates are provided for each of the clutches D, E, and F, these rigid backing plates being identified by reference characters 1, 2 and 3, respectively, and are carried by the rotating sectional drum flywheel G. The sections of the flywheel will be bolted together by elongated bolts 4, as shown in Fig. 6, and have fluid passages 7 extending therethrough to feed fluid to the separate fluid motors as hereinafter described. In each of the clutch assemblies D, E, and F, pressure plates are provided which are indicated by reference characters 8, 9, and 10, respectively, these pressure plates being constructed as shown more clearly in Figs. 3, 6 and 7 and being of annular form to provide relatively thick plate-like bodies 11 with reduced marginal peripheral portions 12 to provide for the movement of the adjacent diaphragm to which the pressure plate is secured.

Each of the fluid motors for operating each of the clutches includes an annular ring-like body 14 having a medial outer annular projection 15 suitably perforated for the reception of rivets or bolts 16 which extend through the diaphragm plates and through the pressure plates 11 to clamp these parts rigidly at their inner marginal edge portions. The outer marginal edge portions of the diaphragm plates are formed with aligned openings 16ª for the passage of the clamping bolts 4 during assembly and between the marginal edges of these diaphragms are the rigid partitions 17 which are in the nature of annular disc-like plates having their inner portions 18 deflected slightly so that these partitions normally are slightly diagonal to the vertical and with reference to the inner walls of the diaphragms when the latter are in their normal positions. The inner edges of the partitions 17 are grooved to receive O-rings 19 to form a seal between the inner edges of the partition and the flat face of the annular projection 15. By this construction a fluid motor is provided which embodies two diaphragms indicated generally by reference characters H and J, and an intermediate partition 17, and a pressure plate 11, these parts being fixed together at their inner marginal edge portions and clamped by the rivets or bolts 16 to the annular projection 15 of the ring structure 14. The outer peripheral edges of the diaphragms H and J are bolted to the flat annular partition 17.

Normally in clutch assemblies of the type in question fluid under pressure is introduced into the chambers formed at each side of the partition 17 that is, between each side of the partition 17 and the adjacent faces of the diaphragms, the pressure of the fluid normally introduced being relatively low and constant, and the two chambers at each side of the partition being of the same capacity the parts are retained in equilibrium which comprehends a neutral position of the clutch. In Fig. 1 a fluid passage is shown at K for one side of one of the partitions in one of the motor assemblies, this passage being indicated also in Fig. 2. Similar passages are provided at suitable spaced points for the other side of each of the partitions as shown in dotted lines in Fig. 3 and indicated by reference character Kª. When one of the motors is to be operated, the static condition maintained by the fluid in similar sized chambers and under the same pressure and with the same centrifugal forces present due to the rotation of the assembly, high pressure fluid is forced into one of the fluid chambers of one of the motor structures which will cause a flexing of the two diaphragm plates, which flexing will cause a lateral movement of the plates and of the parts connected thereto, including the pressure plates 11, urging these pressure plates 11 against its associated clutch to complete a clutching operation. When the high pressure fluid is released the inherent resiliency of the diaphragms will cause a return of the assembly to its normal position.

As stated above, fluid is contained in each of the chambers at each side of the partition 17, this fluid being under low pressure and due to centrifugal forces resulting from the rapid rotation of the unit stabilizes the motor, i. e. the diaphragms H and J and the intermediate partition 17, at a neutral point so that the pressure plate 11 is slightly separated from the clutch assembly. The application of fluid under pressure through ports such as K as shown in Fig. 1 will unbalance the normal low pressure and move the motor unit and the pressure plate 11 so that the latter is in contact with the clutch. The application of high pressure to one of the fluid chambers of the motor causes little disturbance to the fluid in the low pressure side as the movement of the motor is extremely slight and such disturbance as may be caused by high pressure can readily be accommodated on the low pressure side by a reversal in the low pressure line or otherwise.

Referring now to that form of the invention shown in Figs. 1, 2, 3 and 5, it will be seen that in the form of the invention shown by these disclosures that each plate is formed of two sections indicated by reference characters 30 and 31, the hub section 30 being formed with a central opening 32 for seating engagement upon the shoulder 33 (see Figs. 1 and 7) of the ring structure 14. The section 30 is further provided with a plurality of annular rivet or bolt openings 34 and has its outer marginal edge portion 35 flared outwardly a substantial distance. The outer diaphragm section 31 is formed with bolt openings 36 and its inner marginal portion is flared outwardly as at 37, the flare forming a marginal portion lying substantially at right angles to the body of the section. The two sections 30 and 31 are relatively spaced and aligned so that the inner section is offset slightly from the outer section, and when so spaced and aligned provide a pocket area for the reception of a resilient material indicated generally by reference character M, this resilient material forming a connection between the sections 30 and 31 and being bonded thereto throughout the contacting areas of both of the sections. The resilient section M of the diaphragm assembly of the preferred form now being described has its face $m$ inclined to form a continuous dished surface for the inner face of the diaphragm, while the outer face $m'$ of the resilient section of the diaphragm lies flush with the outer faces of the adjacent flared portions of the sections 30 and 31. The resilient section M of each of the diaphragms may be formed of any resilient material and the bonding to the adjacent metal sections may be provided by any suitable known method, it being ample that the resilient material be of such construction and being so constructed and arranged as to perform its required function during the application and release of the pressure in the chamber of which it forms a part.

In Fig. 6 a modification is shown in which one of the walls of the diaphragm chamber indicated by reference character N is formed relatively heavy as compared to the companion diaphragm Nª, and has its lower peripheral portion offset as at 40 to provide the inner cylindrical wall for the fluid chamber and against which the partition 17 cooperates. The offset portion 40 of the diaphragm N is flanged downwardly at 41 to provide an area for the reception of the rivets or bolt fastenings 42 and the marginal edge of the diaphragm N is subsequently flanged in a horizontal plane and parallel to the shoulder 40 and offset with respect thereto to seal the base of the motor structure, this flange 41 further tending to align the parts in assembly and operate as a supporting base for the structure.

Certain compositions or materials which may be used as the resilient element M of the diaphragm assembly may under certain conditions become detached from the metal sections with which it is associated, and accordingly in Figs. 7 and 8 I have illustrated a diaphragm in which the resilient portion M is extended entirely over the inner face of the associated metal parts 30 and 31, this structure preventing the oil from getting under the coating and between the coating and the metal parts and tending to separate these parts due to the forces which may be present or chemicals which may be involved. The covering of the entire diaphragm as shown may not be practical in that form of the diaphragm structure indicated in Fig. 6 by the reference character N, as the shoulder 40 involved in this structure is subjected to movement with respect to the partition 17 and must necessarily comprehend a metal to metal contact. It will be understood that the entire coating of the diaphragm plate with the material forming the resilient portion of the plate is a matter which necessarily will be determined by the material used and the construction and arrangement of parts which may be associated in an assembly.

It will be understood that the dimensions of the resilient intermediate section M of the diaphragm will be directly proportional to the load and torque to which the structure is to be subjected, keeping in mind the fact that the thickness of the material must be such as to provide sufficient resiliency to return the plate to normal position after the application of high pressure to the fluid motor. The cross sectional dimension of the resilient material will likewise depend upon the composition of the material and its inherent resiliency, and will also depend upon the size of the diaphragm and its predetermined movement for accomplishing the operation of the clutch.

What I claim is:

1. In a fluid motor for use in a clutch assembly, the clutch assembly having a clutch plate and a backing plate, said fluid motor including an intermediate fixed wall, a resilient diaphragm arranged at each side of the fixed wall, said resilient diaphragms extending beyond the edge of said fixed wall, a ring-like body interposed between the projecting edges of said diaphragms, said diaphragms being fabricated from metallic sections and interposed rubber sections and being laterally shiftable with respect to the fixed wall upon the application of fluid pressure, a pressure plate, and means extending through a marginal edge portion of the pressure plate and the projecting edges of said diaphragms and said ring-like body to secure the parts together.

2. The structure of claim 1 characterized in that the intermediate fixed wall is of disc form with its inner portion deflected laterally with respect to its outer peripheral margin.

3. The structure of claim 1 characterized in that the intermediate fixed wall is of disc form with its inner portion deflected laterally with respect to its outer peripheral margin, and the diaphragms are secured to said peripheral margin.

4. A flexible diaphragm for fluid motors, comprising spaced ring portions, the adjacent edges of said ring portions being flared outwardly, and resilient material bonded to and connecting the flared portions of said rings.

5. The structure of claim 4 characterized in that the resilient material forms a continuous inner face for the diaphragm.

6. A flexible diaphragm for fluid motors, comprising a pair of spaced, flat ring portions having laterally projecting adjacent marginal flanges, and resilient material interposed between the flanges and bonded thereto.

7. The structure of claim 6 characterized in that the bonded material extends over a substantial area of the pressure side of the diaphragm.

VICTOR K. ATKINS.

References Cited in the file of this patent

UNITED STATES PATENTS

| Number | Name | Date |
|---|---|---|
| 356,997 | Gil | Feb. 1, 1887 |
| 1,135,525 | Hibbard | Apr. 13, 1915 |
| 1,748,827 | Boltshauser | Feb. 25, 1930 |
| 2,169,639 | Grote | Aug. 15, 1939 |
| 2,380,983 | Mock | Aug. 7, 1945 |
| 2,439,849 | Fawick | Apr. 20, 1948 |